US010764900B1

(12) United States Patent
Gopalakrishnan et al.

(10) Patent No.: US 10,764,900 B1
(45) Date of Patent: Sep. 1, 2020

(54) METHOD AND SYSTEM FOR OPPORTUNISTIC SCHEDULING OF BLOCK ACKNOWLEDGEMENT REQUESTS FOR LOCATING IDLE CLIENTS

(71) Applicant: Cisco Technology, Inc., San Jose, CA (US)

(72) Inventors: Guru Gopalakrishnan, Palo Alto, CA (US); Hongbo Liu, Oranmore (IE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/657,754

(22) Filed: Oct. 18, 2019

(51) Int. Cl.
*H04W 72/04* (2009.01)
*H04W 64/00* (2009.01)
*H04W 52/02* (2009.01)

(52) U.S. Cl.
CPC ..... *H04W 72/048* (2013.01); *H04W 52/0216* (2013.01); *H04W 64/006* (2013.01); *H04W 72/0446* (2013.01)

(58) Field of Classification Search
CPC .......... H04W 72/048; H04W 52/0216; H04W 64/006; H04W 72/0446; G01S 1/00; G01S 5/0018; G01S 5/0036; G01S 5/0284; G01S 5/14
See application file for complete search history.

(56) References Cited

U.S. PATENT DOCUMENTS

| 9,219,986 | B2 | 12/2015 | Pandey et al. | |
|---|---|---|---|---|
| 10,225,061 | B2 | 3/2019 | Kim et al. | |
| 2015/0304814 | A1* | 10/2015 | Pandey | H04W 4/023 |
| | | | | 455/456.2 |
| 2017/0374637 | A1* | 12/2017 | Akkarakaran | H04B 7/0617 |
| 2019/0052407 | A1 | 2/2019 | Son et al. | |
| 2019/0109674 | A1 | 4/2019 | Hedayat | |

FOREIGN PATENT DOCUMENTS

WO 2018/080597 A1 5/2018

* cited by examiner

*Primary Examiner* — Quoc Thai N Vu
(74) *Attorney, Agent, or Firm* — Merchant & Gould P.C.

(57) ABSTRACT

The aspects include a method or system that identifies, by an access point (AP), an idle window in a fast locate scan interval. The AP can schedule a Block Acknowledgement Request (BAR) for an idle Station (STA) in the idle window. The AP may then transmit the BAR in the idle window to the idle STA. In response to the BAR, the AP can receive a Block Acknowledgement (BA). The AP may then determine a characteristic about the BA, and, based at least on the characteristic, determine a location of the idle STA.

12 Claims, 9 Drawing Sheets

METHOD AND SYSTEM FOR OPPORTUNISTIC SCHEDULING OF BLOCK ACKNOWLEDGEMENT REQUESTS FOR LOCATING IDLE CLIENTS

TECHNICAL FIELD

The aspects generally relates to electronic communications. More particularly, the systems and methods relate to wireless communications.

BACKGROUND

Network elements, in, for example, Wireless Local Access Networks, often need to know the location of the devices communicating with the network. To determine the location of a device, a network element would send a request to the device and then receive an acknowledgement in response. The network element then determines characteristics of the signal containing the acknowledgement. For example, the network element may determine the Received Strength of Signal Indicator (RSSI). Other network elements can also determine the RSSI for the same device. Then, a set of network elements may triangulate the position of the device based on the received RSSI measurements.

In at least some of these networks, the requests are scheduled in close succession and sent to all the awake devices in an idle client list. The requests may be sent at the start of a fast-locate dwell interval. This process is quite rudimentary and inefficient, which causes delays with any active, in-progress, high priority traffic flows (especially bi-directional flows, e.g., Transmission Control Protocol (TCP)).

SUMMARY

The aspects include a method or system that identifies, by an access point (AP), an idle window in a fast locate scan interval. The AP can schedule a Block Acknowledgement Request (BAR) for an idle Station (STA) in the idle window. The AP may then transmit the BAR in the idle window to the idle STA. In response to the BAR, the AP can receive a Block Acknowledgement (BA). The AP may then determine a characteristic about the BA, and, based at least on the characteristic, determine a location of the idle STA.

Figure 1:
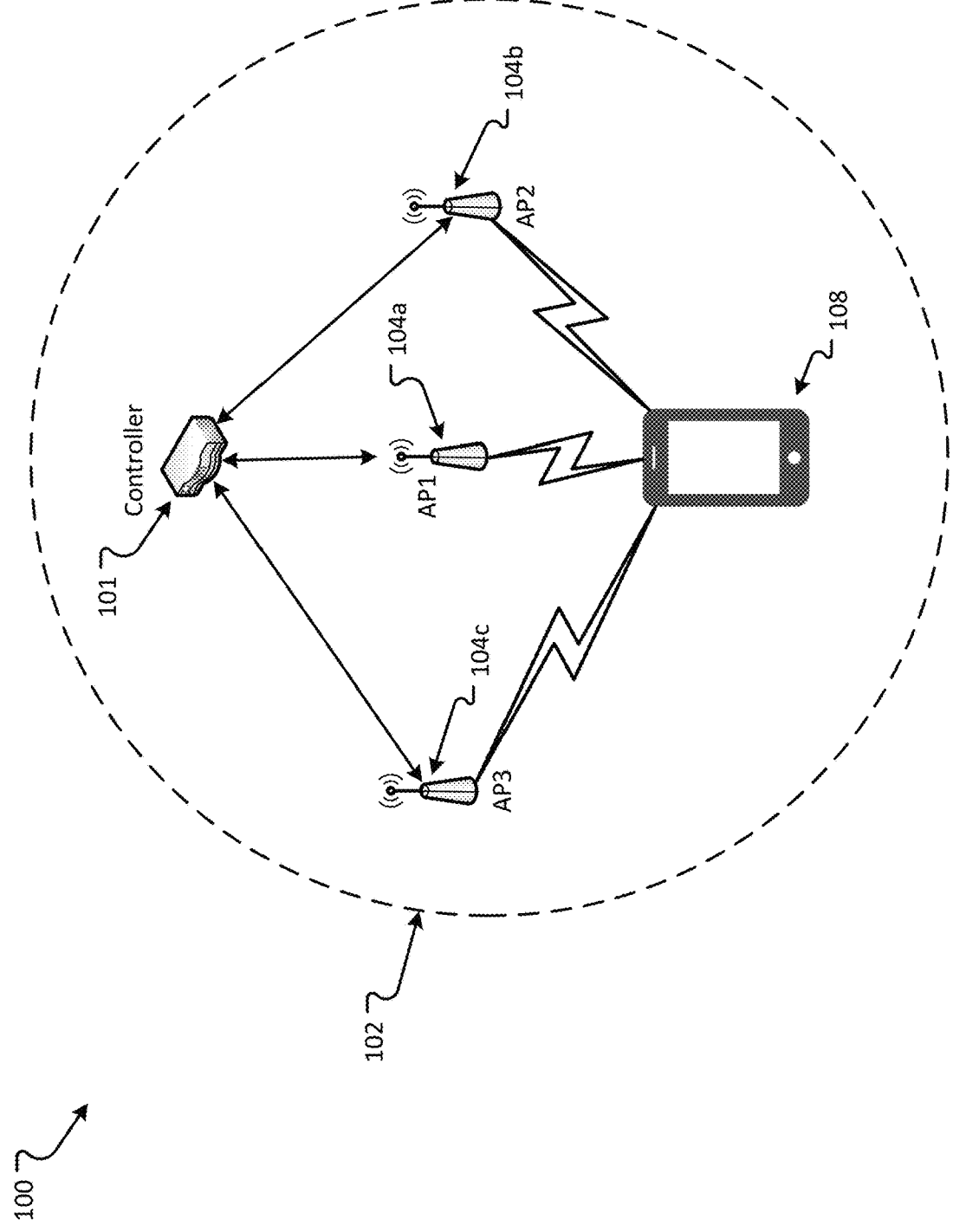
FIG. 1 illustrates an environment having a wireless environment in accordance with aspects of the current disclosure.

In the drawings, like numerals can refer to like components. A letter following the numeral indicates another instance of the same type of component. Like components can share the description of that component. When referring to a component without the letter following the numeral, all components having that numeral indicator may share that description.

DETAILED DESCRIPTION

Overview

Aspects herein generally relate to an opportunistic Block Acknowledgement Request (BAR) scheduler algorithm that distributes BAR transmissions to idle clients evenly within a fast locate scan interval. The BAR scheduler takes into account established Target Wake-time Schedules (TWT) and advantageously employs any Spatial Reuse Parameters (SRP) opportunities that may arise within the scan interval. The algorithm can also be extended to Angle of Attack (AoA) scheduling, which uses a burst of BAR transmissions to each of the clients (both idle/active) for improving location accuracy.

Aspects intelligently employ "idle" windows in a fast locate scan interval to significantly reduce BAR and Block Acknowledgement (BA) exchange overhead that is common when scheduling BARs back to back to all the idle clients, as is done in some existing systems at the start of a scan window. The BAR scheduling algorithm works for all clients (including legacy clients).

Fast Locate is a Hyperlocation feature where multiple neighboring APs scan a set of Wi-Fi channels, at the same time, to get multiple RSSI readings from an uplink transmission from a device and thus locate the device. The fast locate scheduler periodically schedules BAR frames on the serving radios at overlapping intervals where the location radio is also scheduled to scan on one of the serving channels. The BAR frames are scheduled to those associated clients from which no uplink traffic have been received on the location radio during on-channel scans beyond a configurable trigger threshold. This lack of uplink traffic is most likely caused by idle clients entering or having a sleep state for a brief period, and also, in some scenarios, the lack of uplink traffic can be the result of some clients not aligning with fast locate scan windows.

The proposed BAR scheduler attempts to transmit opportunistically BARs in a fast locate scan window to a set of idle clients (both HE and non HE) who have not transitioned to a power save mode and have not established any individual or broadcast Target Wake Time (TWT) agreements with the Access Point (AP). The system can space out targeted BAR transmission times evenly within a fast locate scan interval and may take into account established TWT schedules, beacon transmission times, power save traffic after beacon transmissions, etc.

With introduction of TWT based scheduling, a beacon interval can be ideally broken down into multiple "slots," where the BARs to be sent to idle non-TWT agreement established awake High Efficiency clients and non-High Efficiency legacy clients can be transmitted in "non-TWT" slots. The time interval between two consecutive BAR transmissions, in a fast locate scan interval, is governed by the equation.

$$\text{Time Interval} = \frac{\begin{array}{c}(((\text{number of non-}TWT \text{ slots} * \text{slot time}) - \\ \text{start offset}) - \text{end offset})\end{array}}{\text{number of BAR clients}}$$

The "number of non-TWT slots" is a number of non-TWT slots that fall within the current fast locate scan interval. The "slot time" is the amount of time allotted for a slot in the fast locate scan interval. The "start offset" can be the amount of time at the beginning a scan interval and the "end offset" can be the amount of time at the end of the scan interval. The start offset and end offset compensate for any channel switch delays. The "number of BAR clients" can be the number of devices that are idle and may need to be sent a BAR.

The system can transmit the BARs to the clients in the increasing order of a "sleep likelihood" factor. Thus, clients with a lower likelihood of having transitioned to a power save mode are scheduled first, and those clients with a higher likelihood of having transitioned to a sleep mode are scheduled towards the end of the fast locate scan window. This ordering provides more time for higher "sleep likelihood" clients to transition to a Power Save (PS) mode, typically by sending a Quality Of Service (QOS)-NULL frame, with the Power Management (PM) bit set, to an AP. The AP can use the RSSI of the QOS-NULL frame transmission for fast location and thus eliminate the need for a BAR-BA exchange.

The system can use average time taken by a given client to transition to PS mode (by sending an uplink frame with PM bit set) after becoming idle to compute the "sleep likelihood" factor for that client at any given time. Thus, for a given client, the longer the duration from the last Physical Layer Convergence Procedure (PLCP) Protocol Data Unit (PPDU) Transmit Opportunity (Tx) or Receive Opportunity (Rx) indicates a higher sleep likelihood. However, at least in some configurations, the magnitude of increase of the "sleep likelihood" factor can be decided from the average time taken by that station to transition to the PS mode after becoming idle.

The method can opportunistically burst BARs to clients, pending a BAR Tx, at a given time in a fast locate scan interval. The system can use Spatial Reuse PPDU (SRP) to initiate the BAR-BA exchange during any SRP opportunity that may arise with a subset of SRP supported clients. Further, the system can analyze the neighbor AP report and/or recent location history to select a desired subset of SRP supported idle clients that do not overlap with an Other Basic Service Set (OBSS) AP that allows SRP-based SR transmissions. These selected clients do not have to reduce the Tx power considerably, to meet acceptable receiver interference levels at the OBSS AP, while transmitting BARs during the SRP opportunity to the AP thereby avoiding any location inaccuracies. Also, if the received BA RSSI, recorded for a given client during a SRP opportunity, is lesser than the previously RSSI recorded value by some amount above a predetermined threshold, the newly-recorded RSSI shall be discarded. Then, a new BAR Tx is scheduled, to the client, in a non-SR PPDU to avoid location inaccuracies.

Transmitting a burst of BARs, during a SRP opportunity whenever possible, is better suited for AoA scanning because multiple BARs (e.g., a total of 16 BARs) can be sent to each of the selected clients within a scan window of 250 ms. Also, when there is no Downlink (DL) traffic is present to transmit at AP, the AP can use lowest priority Traffic Identifier (TID) to burst BARs to the clients pending BAR Tx, at a given time, while considering uplink fairness.

Aspects herein are generally directed to wireless communications systems that can perform according to one or more wireless communications standards. For example, some aspects may involve wireless communications performed according to Wi-Fi standards developed by the IEEE 802.11, for example, may involve wireless communications performed in accordance with an IEEE 802.11ax. Some aspects may involve wireless communications performed in accordance with other standards, rules, regulations, guidance, etc. Some aspects may additionally or alternatively involve wireless communications according to one or more other wireless communication standards, for example, and without limitation, other IEEE wireless communication standards, such as the IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, IEEE 802.11 ah, and/or IEEE 802.11ay standards, Wi-Fi Alliance (WFA) wireless communication standards, such as, Wi-Fi, Wi-Fi Direct, Wi-Fi Direct Services, Wireless Gigabit (WiGig), WiGig Display Extension (WDE), WiGig Bus Extension (WBE), WiGig Serial Extension (WSE) standards and/or standards developed by the WFA Neighbor Awareness Networking (NAN) Task Group, Machine-Type Communications (MTC) standards such as those embodied in 3GPP Technical Report (TR) 23.887, 3GPP Technical Specification (TS) 22.368, and/or 3GPP TS 23.682, and/or Near-Field Communication (NFC) standards such as standards developed by the NFC Forum, including any predecessors, revisions, progeny, and/or variants of any of the above.

Likewise, some aspects may involve wireless communications performed according to one or more broadband wireless communication standards, for example, 3rd Generation Partnership Project (3GPP), 3GPP Long Term Evolution (LTE), and/or 3GPP LTE-Advanced (LTE-A) technologies and/or standards. Additional examples of broadband wireless communication technologies/standards may include Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1.times.RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards.

Example Embodiments

Embodiment of an environment 100 including a basic service set (BSS) 102 may be as shown in FIG. 1. The components of the BSS 102 may communicate with components outside the BSS 102, which can include a controller 101 or other device or network elements. The Stations (STAs) 108 can communicate with one or more APs 104a, 104b, and 104c in the environment 100.

The environment 100 can include one or more of, but is not limited to, a controller/Wireless Local Area Network (LAN) Controller (WLC) 101, one or more APs 104a-104c, a client STA 108, etc. Each of these different systems or components may be hardware, software, or a combination of hardware and software. Each of the various components 101 through 108 can be as described in conjunction with FIG. 6.

The STAs 108 may include one or more High-Efficiency Wireless (HEW) (as illustrated in, e.g., the IEEE 802.11ax standard) STAs, future defined types of STAs, and/or one or more legacy (as illustrated in, e.g., the IEEE 802.11n/ac standards) STAs. The STAs 108 may be wireless devices, for example, a cellular telephone, a smart telephone, a handheld wireless device, wireless glasses, a wireless watch, a wireless personal device, a tablet, or another device that may be transmitting and receiving using an IEEE 802.11 protocol. In the operating environment 100, an AP 104 may generally manage access to the wireless medium in the Wireless LAN (WLAN) for the STA 108.

Figure 6:
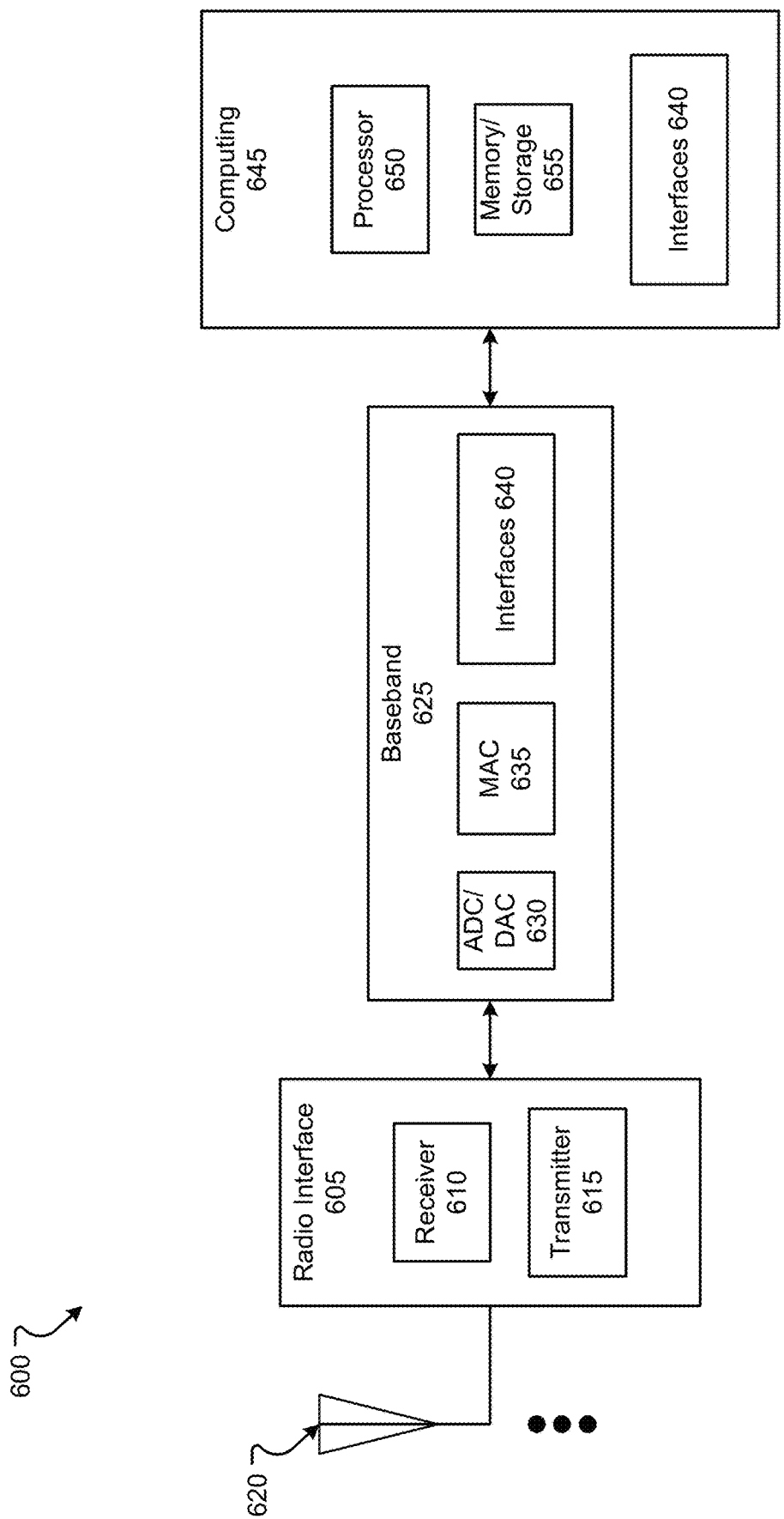
FIG. 6 illustrates an embodiment of a station, access point, or other component in the environment in accordance with aspects of the current disclosure.

The AP 104 may be an 802.11 base station but may use other communications protocols as well as the IEEE 802.11 protocol. The IEEE 802.11 protocol may include using Orthogonol Frequency Division Multiple Access (OFDMA), Time Division Multiple Access (TDMA), and/or Code Division Multiple Access (CDMA). The IEEE 802.11 protocol may include a multiple access technique. For example, the IEEE 802.11 protocol may include Space-Division Multiple Access (SDMA) and/or Multiple-User Multiple-Input Multiple-Output (MU-MIMO). An example configuration of the APs 104 and/or controllers 101 may be as shown in FIG. 6.

The environment 100 includes the BSS 102, one or more STAs 108 that may associate and/or communicate with the AP 104 to join the WLAN. Joining the WLAN may enable STAs 108 to wirelessly communicate with each other via AP 104, with each other directly, with the AP 104, or to another network or resource through the AP 104. In some configurations, to send data to a recipient, a sending STA may transmit an Uplink (UL) Physical Layer Convergence Procedure (PLCP) Protocol Data Unit (PPDU) comprising the data, to AP 104, which may then send the data to the recipient STA 108, in a DL PPDU. The PLCP is the physical layer protocol that is used with 802.11 and other standards.

In some configurations, a frame of data transmitted between the STAs 108 or between a STA 108 and the AP 104 may be configurable. For example, a channel used for communication may be divided into subchannels that may be 20 MHz, 40 MHz, or 80 MHz, 160 MHz, of contiguous bandwidth or an 80+80 MHz (160 MHz) of non-contiguous bandwidth. Further, the bandwidth of a subchannel may be incremented into 1 MHz, 1.25 MHz, 2.03 MHz, 2.5 MHz, 5 MHz 10 MHz bandwidths, a combination thereof, or any other bandwidth division that is less or equal to the available bandwidth may also be used. The bandwidth of the subchannels may be based on a number of active subcarriers. The bandwidth of the subchannels can be multiples of 26 (e.g., 26, 52, 104, etc.) active subcarriers or tones that are spaced by 20 MHz. In some configurations, the bandwidth of the subchannels is 256 tones spaced by 20 MHz. In other configurations, the subchannels are a multiple of 26 tones or a multiple of 20 MHz. A 20 MHz subchannel may also comprise 256 tones for use with a 256 point Fast Fourier Transform (FFT); however, other combinations are possible and using 256 tones in a 20 MHz subchannel is not necessary to execute the methods herein.

When managing access to the wireless medium in the WLAN environment 100, the AP 104 may schedule medium access, for the sending STA 108b, during a UL time interval, during which the AP 104 may refrain from transmitting over the wireless medium. The UL time interval may comprise a portion of a Transmit Opportunity (TXOP) owned by AP 104.

At a given point in time, multiple STAs, in the WLAN of the environment 100, may wish to send data. In some configurations, rather than scheduling medium access for STAs 108 in different respective UL time intervals, the AP 104 may schedule medium access for STAs 108 to support UL MU transmission techniques, according to which multiple STAs 108 may transmit UL MU PPDUs to the AP 104 simultaneously during a given UL time interval. For example, by using UL MU OFDMA techniques during a given UL time interval, multiple STAs 108 may transmit UL MU PPDUs to the AP 104 via different respective OFDMA Resource Units (RUs) allocated by the AP 104. In another example, by using UL MU-MIMO techniques during a given UL time interval, multiple STAs 108 may transmit UL MU PPDUs to the AP 104 via different respective spatial streams allocated by the AP 104.

To manage access, the AP 104 may transmit a master-sync transmission, which may be a Trigger Frame (TF) or a control and schedule transmission, at the beginning of the control period. The AP 104 may transmit a time duration of the TXOP and sub-channel information. During the control period, STAs 108 may communicate with the AP 104 in accordance with a non-contention based multiple access technique, such as OFDMA or MU-MIMO. This technique is unlike conventional WLAN communications in which devices communicate in accordance with a contention-based communication technique, rather than a multiple access technique. During the control period, the AP 104 may communicate with stations 108 using one or more control frames, and the STAs 108 may operate on a sub-channel smaller than the operating range of the AP 104.

During the master-sync transmission, the STAs 108 may contend for the wireless medium with the legacy devices 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, a Frequency Division Multiple Access (FDMA) technique, or a SDMA technique.

Similarly, STAs 108, in the WLAN of the environment 100, may need to receive data. Again, rather than scheduling medium access for STAs 108 in different respective DL time intervals, the AP 104 may schedule medium access for STAs 108 to support DL MU transmission techniques, according to which multiple STAs 108 may receive DL MU PPDUs from the AP 104 simultaneously during a given DL time interval. For example, by using DL MU OFDMA techniques during a given UL time interval, multiple STAs 108 may receive DL MU PPDUs from the AP 104 via different respective OFDMA RUs allocated by the AP 104. In another example, by using DL MU-MIMO techniques during a given DL time interval, multiple STAs 108 may receive DL MU PPDUs from the AP 104 via different respective spatial streams allocated by the AP 104.

To manage access, the AP 104 may transmit a master-sync transmission, which may be a TF or a control and schedule reception, at the beginning of the control period. The AP 104 may transmit a time duration of the Receive Opportunity (RXOP) and sub-channel information. During the control period, STAs 108 may communicate with the AP 104 in accordance with a non-contention based multiple access technique, such as OFDMA or MU-MIMO. During the control period, the AP 104 may communicate with stations 108 using one or more control frames, and the STAs 108 may operate on a sub-channel smaller than the operating range of the AP 104.

During the master-sync transmission, the STAs 108 may contend for the wireless medium with the legacy devices 108 being excluded from contending for the wireless medium during the master-sync transmission. The TF used during this master-sync transmission may indicate an UL-MU-MIMO and/or UL OFDMA control period. The multiple-access technique used during the control period may be a scheduled OFDMA technique, or alternatively, may be a TDMA technique, FDMA technique, or a SDMA technique.

The AP 104 may also communicate with legacy stations and/or stations 108 in accordance with legacy IEEE 802.11 communication techniques. In some configurations, the AP 104 may also be configurable to communicate with stations 108 outside the control period in accordance with legacy IEEE 802.11 communication techniques, although this is not a requirement.

Controller 101 may be operable to manage the configuration and communications infrastructure of the one or more APs 104 within the environment 100. This control includes managing uplink and downlink data transmissions from one or more APs 104 to the stations 108.

Figure 2:
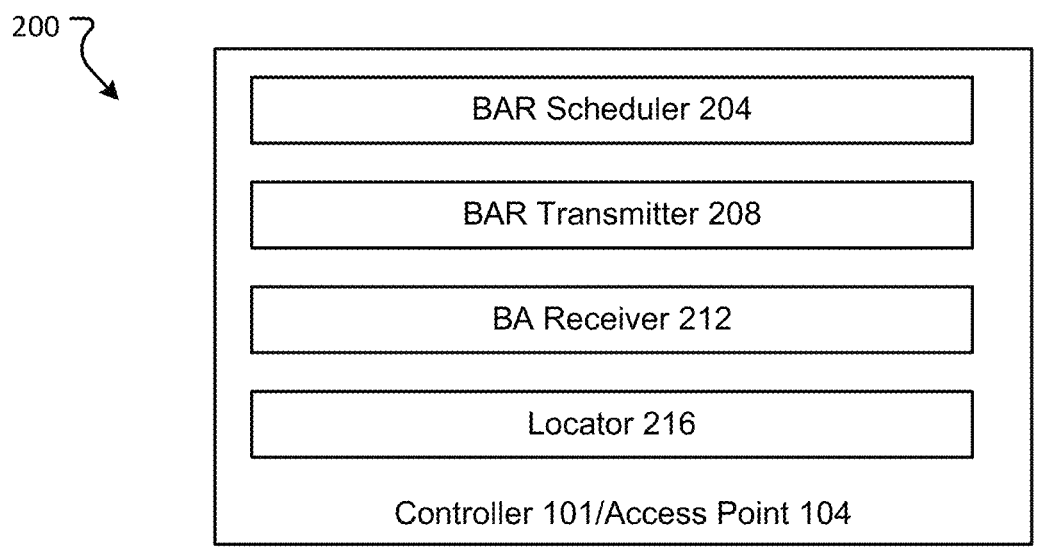
FIG. 2 illustrates an access point in accordance with aspects of the current disclosure.

Various components or elements of the AP 104 and/or controller 101, as described in conjunction with FIG. 1, may be as shown in FIG. 2. The elements of the AP 104 and/or controller 101 can include one or more of, but is not limited to, a BAR scheduler 204, a BAR transmitter 208, a BA receiver 212, and/or a locator 216. The components 204-216 of the controller 101 or AP 104 can be hardware, software, or a combination of hardware or software.

The BAR scheduler 204 can determine which stations 108 may be out of contact or have entered an idle or power save mode. Further, the BAR scheduler 204 can determine which stations may have been in contact with the AP 104 at some recently preceding the current time period. Of the out-of-contact stations 108, the BAR scheduler 204 can schedule or determine when to send a BAR to determine whether the different stations 108 are still within the BSS of the AP 104 and locate those STAs 108. The BAR scheduler 204 can also determine which non TWT slots may be used for sending the BARs to the various stations 108 and transmit this information to the BAR transmitter 208.

The BAR transmitter 208 can transmit the BAR during the scheduled time slots provided by the BAR scheduler 204. The BAR transmitter 208 sends the BAR in a beacon slot or other transmission during a fast locate window, as required by the BAR scheduler 204. Thus, the BAR transmitter 208 can create the BAR frame and the data in the BAR may then be sent to the BA receiver 212.

The BA receiver 212 can receive the block acks from the one or more idle client stations 108. Thus, the information from the BAR transmitter 208 can be compared to BAs received by the BA receiver 212 to determine which idle clients responded to the BAR transmission. Other signals may be received by or forwarded to the BA receiver 212, such as a QoS Null frame for client STAs 108, as they are entering or coming out of a power save mode. Information about the BA, QoS Null, or other signals received above BA receiver 212 may then be sent to the locator 216.

The locator 216 can store and compare the RSSI or other information about the signal(s) received from the BA receiver 212. This signal information may be used, by the locator 216, to coordinate with one or more other AP's 104, the controller 101, or other system to locate the idle client STAs 108. For example, the locator 216 can compare the RSSI or other information, with the information from the same signal as received by other AP's 104, to triangulate the position of the responding STAs 108. This location information may then be provided to the controller 101, other the APs 104, or other systems in the environment 100 to coordinate transmissions to the STA 108.

Figure 3:
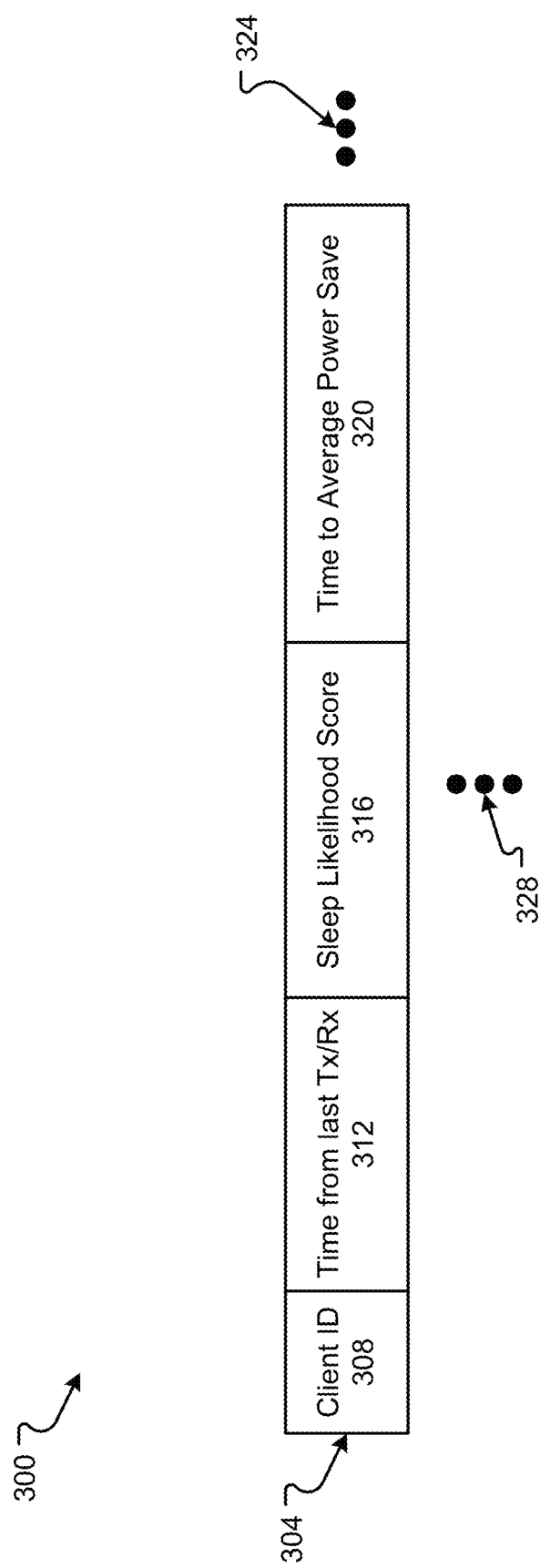
FIG. 3 illustrates a data structure that may be received, stored, retrieved, managed, etc., in accordance with aspects of the current disclosure.

An example of a data store 300 comprising data structures that may be sent, received, stored, retrieved, or managed in the environment may be as shown in FIG. 3. The signals may be stored by an AP 104, a controller 101, or other components within the environment 100. An embodiment of a data structure 304 for storing information about one or more STAs 108, at the AP 104 or controller 101, may be as shown in FIG. 3. The information can include one or more of, but is not limited to, a client ID 308, a time from last transmission or reception 312, a sleep likelihood score 316, and/or a time to the average power save 320. There may be more or fewer fields stored in data structure 304, as represented by ellipses 324. Each different station 108, in the BSS 102 or environment 100, may have a separate data structure 304, as represented by ellipses 328.

The client identifier (ID) 308 may be any type of identifier that identifies the STA 108 in the environment 100. Thus, the client ID 308 can include alpha numeric IDs, numeric IDs, globally unique identifiers (GUIDs), MAC addresses, URL addresses, etc. Regardless of the type of identifier, the client ID 308 uniquely identifies the STA 108, in the environment 100, or amongst other STAs 108 either in or out of the environment 100.

A time from the last transmit opportunity or transmission or last receive opportunity or transmission 312 can be an indication of how long there has been a lack of communication with the STA 108. This time 312 may be registered in milliseconds, seconds, etc. Any kind of transmission or reception may reset the clock for the time from last TX/RX 312. For example any type of poll or acknowledgement of a signal may suffice to reset the clock for the time 312.

A sleep likelihood score 316 is an indication or the probability that the STA 108 is in a power save or sleep mode. The sleep likelihood score 316 can be calculated based on the information in fields 312, 320 and the type of station 108 identified, possibly by the client ID 308. This information will indicate how likely it is, based on the time since the last transmission or reception 312, that the STA 108 is currently in a power save or sleep mode. Further, the sleep likelihood score 316 may also be based on the time to average power save information 320.

The time to average power save information 320 can indicate the amount of time that the average STA 108, within the environment 100, takes before entering a power save mode. In other configurations, the time to average power save information 320 can indicate an average of past times that this STA 108 has taken to enter a power save mode. Thus, this information can be a standard or number based on all stations 108, a majority of STAs 108, or just his STA 108 in the environment 100.

Figure 4A:
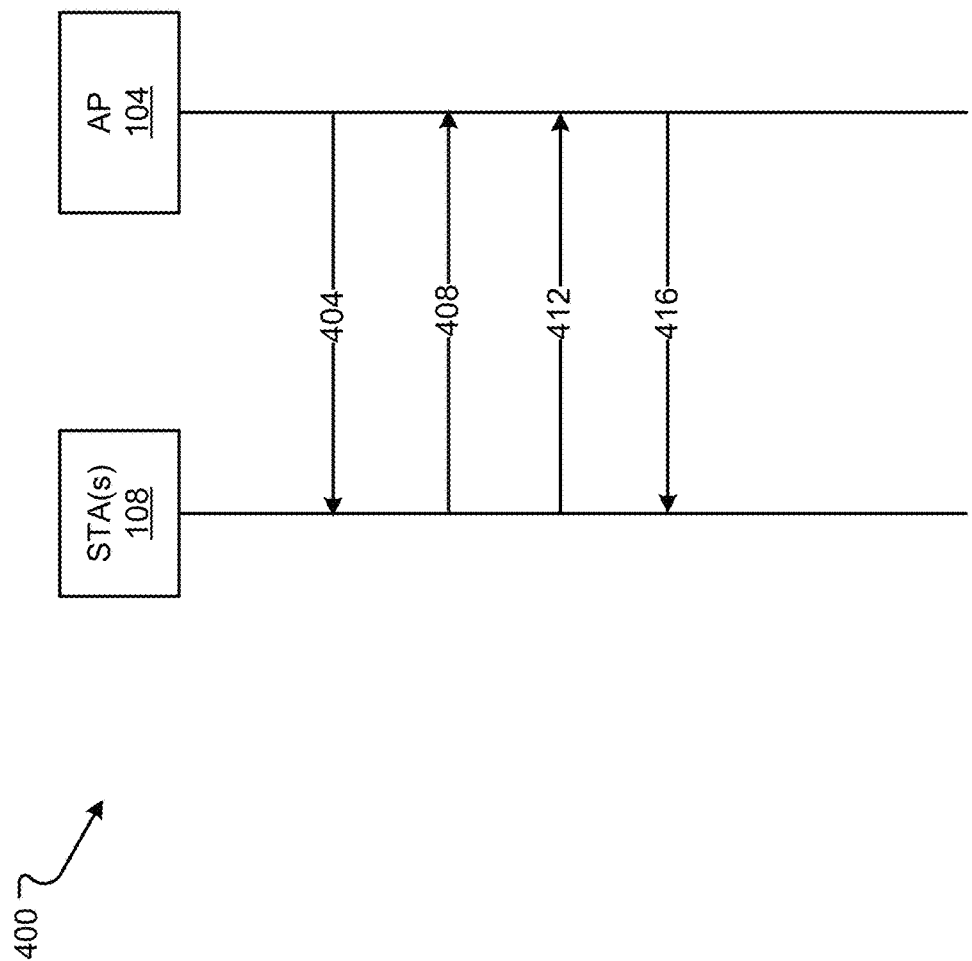
FIG. 4A illustrates a signaling process in accordance with aspects of the current disclosure.

An example of a signaling process 400 for exchanging signals between an AP 104 and a STA 108, in the environment 100, may be as shown in FIG. 4A. The AP 104 may send a BAR request 404, to a STA 108. If in a power save mode and unable to respond to the BAR 440 with a block acknowledgement, the STA 108 may respond with a QOS null frame 408 that is sent back to the AP 104 or not respond at all. However, if the STA 108 is able to awake or exit the idle mode or is not in an idle mode, the STA 108 may send a block acknowledgement signal 412 back to the AP 104, in response to the BAR frame 404. In some configurations, if the QOS null frame 408 is received by the AP 104, the AP 104 may then send another BAR frame 416, at a later time, for the STA 108 to respond, after waking from the idle mode. In this way, if the AP 104 is not able to receive enough data from the QOS null frame 408 to locate STA 108, the AP 104 may resend the BAR frame 416 to receive a block ack 412 that can be used for location information.

Figure 4B:
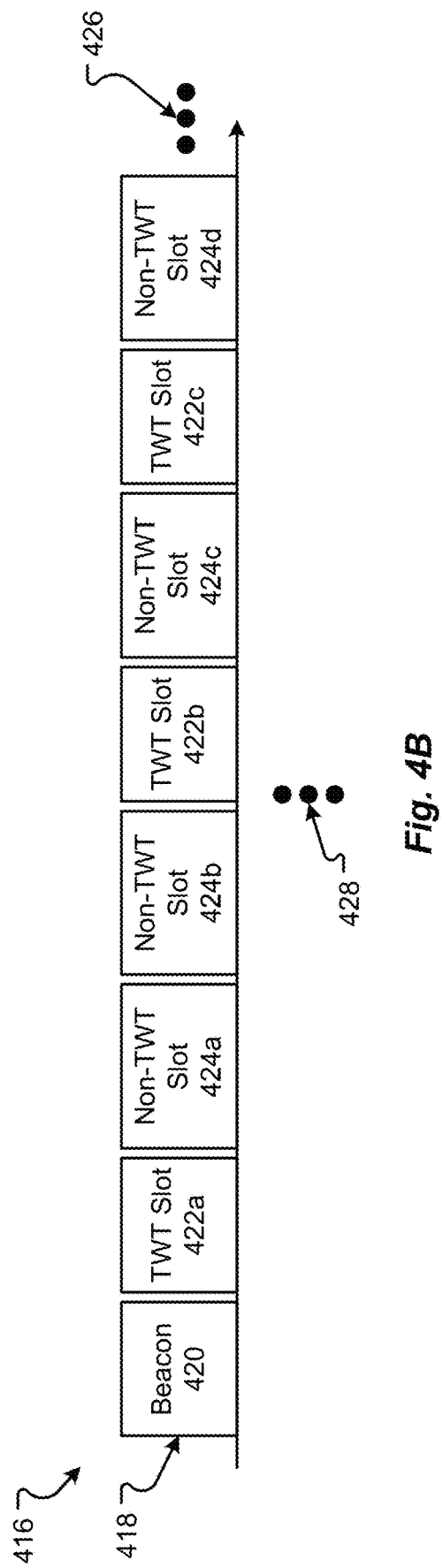
FIG. 4B illustrates a signaling process in accordance with aspects of the current disclosure.

An example fast locate interval that can incorporate the BAR frame in one or more beacon 418 may be as shown in FIG. 4B. The beacon frame 422 can include one or more of, but is not limited to, beacon information 420, one or more target wait time slots 422A-422C, one or more non-TWT slots 424A-424D, or other information or portions within the beacons 418. The beacon interval may have more or fewer slots than that shown in FIG. 4B, as represented by ellipses 426. Each fast locate interval 416 may have a different format or arrangement of slots, as represented by ellipses 428.

Beacon information 420 can include a beacon ID, beacon information for associated with the AP 104, or other information or metadata associated with the beacon, including which AP 104 sent the beacon, any information to contact the AP 104, or other such information. This beacon information 420 may be as understood in the art.

The Target Wait Time (TWT) slots 422a-422c can include information for one or more STAs 108 regarding target wait time scheduling. Target wait time slots 422 are sent to STAs 108 for scheduling uplink and downlink with STAs 108 capable of using newer 802.11 standards. In at least some configurations, the TWT slots 422 can be used to send BAR requests.

Non-TWT slots 424A-424D represent slots in the beacons 418 to schedule uplink or downlink transmissions with non-TWT agreement established awake High Efficiency clients or non-High Efficiency legacy client stations 108 that may be employing older 802.11 standards. As there are fewer of these older STAs 108, many of the non-TWT slots 424 may be available for placing other information and transmissions of the beacon 418. As such, the non-TWT slots 424 can be used to place BARs and be sent to idle clients. These BARs allow for contacting the STAs 108 that may be idle to respond and be located by the AP 104.

Figure 4C:
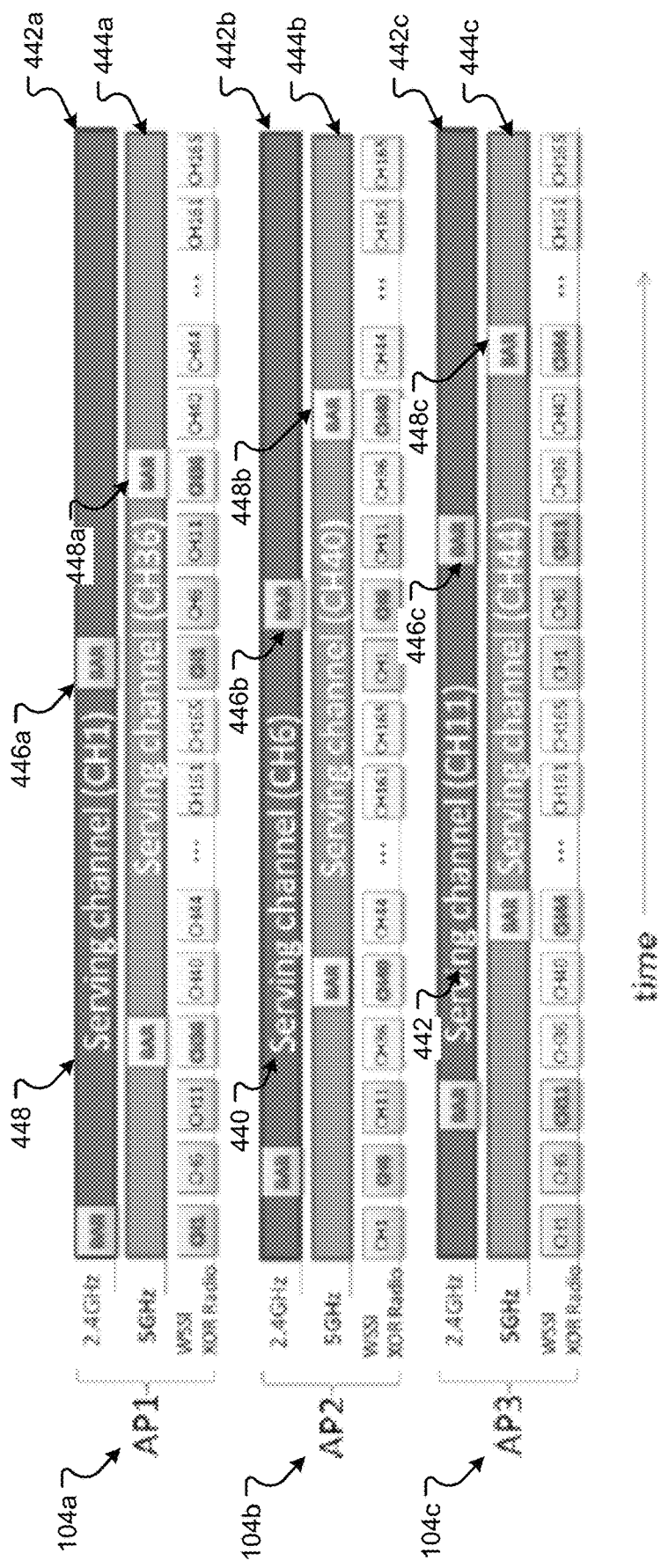
FIG. 4C illustrates a signaling process in accordance with aspects of the current disclosure.

Another signaling processes between and among multiple APs 104a-104c to send BAR frames may be as shown in FIG. 4C. Each of the AP's 104 can send information on one or more serving channels 442a-442c and 444a-444c. The serving channels can be used to send bars 446a-446c or 448c-448c. Thus, the signaling operations show what may occur for signals from the first AP 104a, in portion 448, from AP to 104b, in portion 440, and from AP 104c, in portion 442. The BAR frames 446, 448 may be sent or staggered in overlapping intervals. For example, BAR frame 446a is sent before BAR 446b, which is in turn sent before BAR frame 446c.

The BAR frames 446 may be sent in a fast locate window that schedules the BAR frames 446 on the radios in overlapping intervals. The response to the BAR frames may be listened to by the APs 104, where information, such as the RSSI, is gleaned from the responses in block acks. The BAR frames 446 may only be sent to those STAs 108 that have a time from last TX/RX 312 beyond a predetermined threshold. Thus, only those likely idle clients may be sent the BAR frames 446 and need to respond.

Figure 5A:
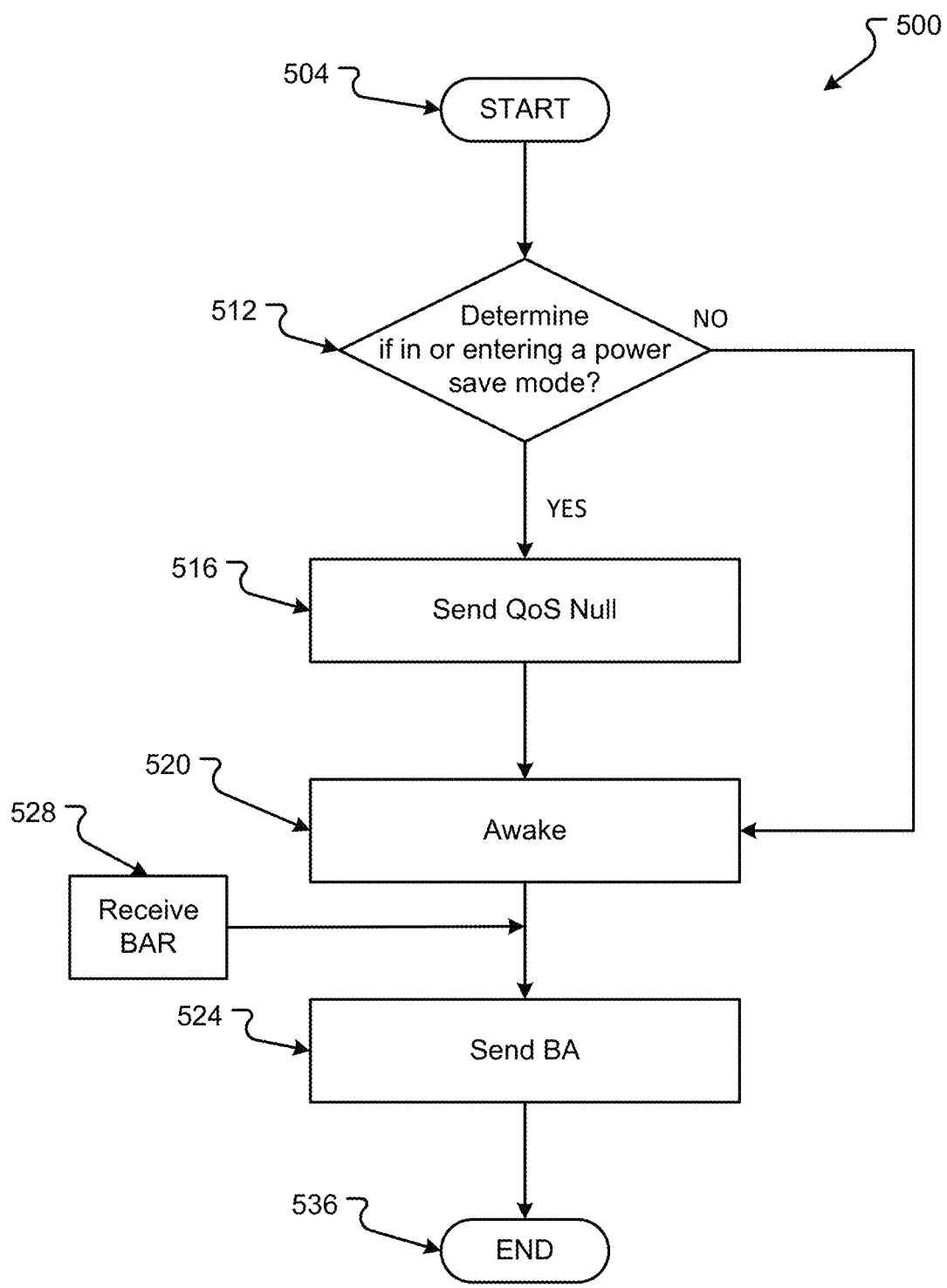
FIG. 5A illustrates a process for communicating with idle clients in accordance with aspects of the current disclosure.

A method 500 for responding to BARs, as performed by a STA 108, may be as shown in FIG. 5A. Generally, the method 500 starts with a start operation 504 and ends with an end operation 536. The method 500 can include more or fewer stages or can arrange the order of the stages differently than those shown in FIG. 5A. The method 500 can be executed as a set of computer-executable instructions, executed by a computer system or processing component, and be encoded or stored on a storage medium. Further, the method 500 can be executed by a gate or other hardware device or component in an ASIC, a FPGA, or other type of hardware device. Hereinafter, the method 500 shall be explained with reference to the systems, components, modules, software, data structures, etc. described herein.

The STA 108 may determine if it is in a power save mode, in stage 512. After a long idle time, the STA 108 may enter a power save mode. In a power save mode, it may be not possible to respond to a BAR request if the radio needs to wake up to send a signal. If the device is in or is about to enter a power save mode, the method 500 may proceed YES to stage 516. However, if the STA 108 is not in a power save mode, the method 500 may proceed NO to stage 520, where the STA 108 can remain in an awake mode and send a BA back to the AP 104.

In stage 516, a QoS null frame may be sent by the STA 108 to the AP 104. The QoS null frame may include a null value or a "0" in the Power Management (PM) section of the frame sent back to the AP 104. The QoS null frame may indicate that the STA 108 will enter the PS mode. However, the AP 104 may still conduct some or all location processes using the QoS null frame.

In at least some configurations, the STA 108 may remain in or enter awake mode, in stage 520, from the power save or idle mode. The wake process may enable the radio to send a signal. Reamining in the awake mode allows the STA 108 to reply to a BAR.

The STA 108 can receive a BAR, in stage 528. The BAR may be sent from an AP 104 over a serving channel 332, 334. The BAR frame 404 may be sent during a beacon slot 422, 424, as described in conjunction with FIG. 4B. If the BAR is for a high efficiency or new STA 108, the BAR may be sent during a target wait time slot 422. If the STA 108 is an older station using older 802.11 standards or non-TWT agreement established awake High Efficiency stations, the STA 108 may receive the BAR in a non-TWT slot 424. However, any STA 108 may receive a BAR in the non-TWT slot 424.

Figure 5B:
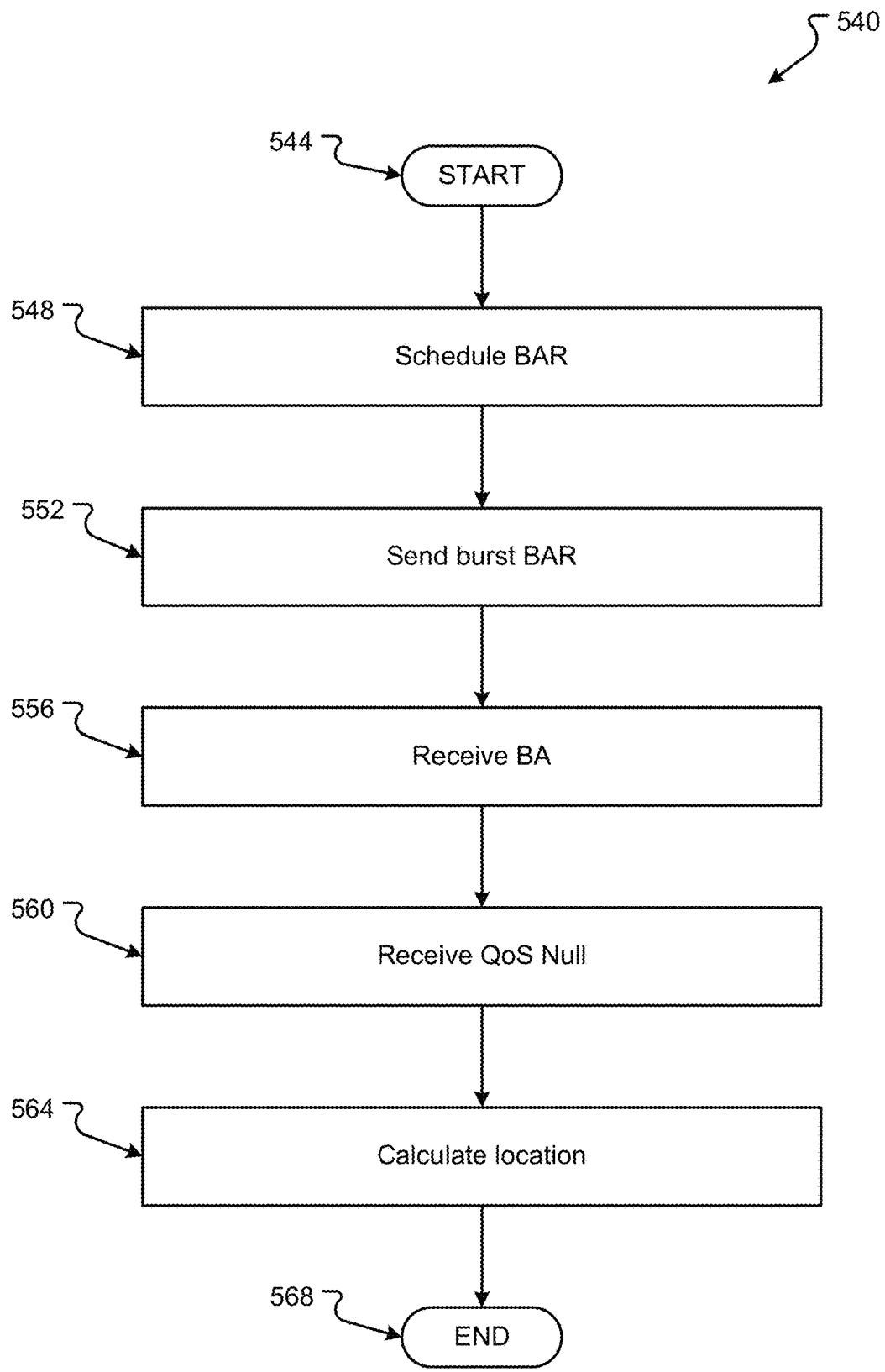
FIG. 5B illustrates another process for communicating with idle clients in accordance with aspects of the current disclosure.

After receiving and in response to the BAR sent in stage 528, the STA 108 can send a BA, in stage 524. The BA may be as understood in the art and be sent as a reply to the BAR. This BA can be sent to the AP 104 or transmitted to numerous APs 104. The BA may include other information allowing the AP 104 to locate the STA 108. Another method 540 for sending or determining locations of idle clients may be as shown in FIG. 5B. The method 540 may be as executed by an AP 104. Generally, the method 540 starts with a start operation 544 and ends with an end operation 568. The method 540 can include more or fewer stages or can arrange the order of the stages differently than those shown in FIG. 5B. The method 540 can be executed as a set of computer-executable instructions, executed by a computer system or processing component, and be encoded or stored on a storage medium. Further, the method 540 can be executed by a gate or other hardware device or component in an ASIC, a FPGA, or other type of hardware device. Hereinafter, the method 540 shall be explained with reference to the systems, components, modules, software, data structures, etc. described herein.

The AP 104 can schedule BAR transmissions, in stage 548. The BAR scheduler 204 can opportunistically transmit BARs, in a fast locate scan window, to idle client stations 108, which may be both high efficiency STAs 108 and non-high efficiency STAs 108. Some of the stations 108 may have transitioned to a power save mode. However, for those STAs 108 not in a power save mode, the BAR scheduler 204 can determine to send BAR to the STAs 108 that have not established TWT agreements with the AP 104 and may be idle. For example, those stations 108 may have a time from last Tx/Rx 312 that is over some predetermined threshold. The threshold may be determined from the time to average power save 320 or other information.

The BAR scheduler can space out the targeted BAR transmissions in the fast locate window. Further, several AP's 104a-104c may also stagger their BAR transmissions during this fast locate window. The scheduling of the BARs may take into account the TWT schedules for one or more of the STA 108 in communication with the APs 104, the beacon transmission times shown in FIG. 3, the power save traffic or power save modes entered by STAs 108 after beacon transmissions, etc. The beacon interval can be established, and the intervals may be assigned to different slots. For example, BARs to idle non high-efficiency STAs or non-TWT agreement established awake High Efficiency STAs 108 may be sent during non-TWT slots as described in FIG. 4B. In other configurations, BARs to high efficiency STAs 108 or TWT STAs 108 may be sent during TWT slots 422, as shown in FIG. 4B.

There may be a time interval required between two consecutive BAR transmissions in some configurations. This time interval may be determined by an algorithm. This algorithm can be the number of non-TWT slots times the slot time for each of those non-TWT slots minus a start offset and minus an end offset, with the result of that equation being divided by the number of clients to be sent a BAR. Thus, based on the number of non-TWT slots in the fast locate scan interval and the amount of offset needed between the beginning and end of the scan interval, the number of different BAR transmissions can be determined to be sent during a fast locate scan interval. Based on this schedule and based on the sleep likelihood factor, the BAR scheduler can determine which STAs 108 should receive a BAR transmission during one of the beacon intervals and in what order those BARs should be sent to the STAs 108. This schedule then may be sent to the BAR transmitter 208.

The BAR transmitter 208 may send or burst the BARs out in transmissions, in stage 552. The BAR transmitter 208 may then transmit the BARs to STAs 108 in increasing order of a sleep likelihood score 316. STAs 108 with a lower likelihood of transition to power save mode are scheduled first and those with a higher likelihood of entering a power save mode may be scheduled at the end of the fast locate scan window. In this way, the BAR transmitter gives more time for clients with a higher likelihood that the will enter a power save mode to transition to the power save mode. If the client STA 108 is transitioning, the client STA 108 can send a QoS Null frame, with the PM bit set, that indicates to the AP 104 that the STA 108 is transitioning the power save mode. The RSSI for this QoS Null frame may be used for location determination used by the locator 216 described hereinafter. The use of the QoS Null frame can then obviate the need for a BAR/BA exchanged herein to allow the STA 108 to enter the power save mode.

The average time taken by a STA 108 to transition to the PS mode as provided in FIG. 3, can be used to help determine whether that STA 108 has a higher likelihood of entering the sleep mode. When the current time is farther from the last time recorded for a PPDU transmit/receive, there is a higher likelihood that the STA 108 is entering or will enter a PS/sleep mode. The change of magnitude of the factor of sleep likelihood factor 316 may be decided by the average time it takes for the STA 108 to transition to the power save mode after becoming idle. As such, the STAs 108 within the environment 100 are more specifically understood based on the average time to the power save mode 320.

The BAR transmitter 208 may then opportunistically burst BARs to the various STAs 108 based on the slots the BARs are scheduled in, in the fast locate scan interval. The BAR transmitter 208 can use spatial reuse (SR) PPDU (SR-PPDU) to initiate the BAR/BA exchange during the SR-PPDU opportunity that arises as a part of SRP with a subset of high efficiency client stations 108. The subset may be determined by access signals or reviewing recent location history based on neighbor AP reports or other information to ensure that the selected subset of clients used does not overlap with an Other BSS (OBSS) which allowed SRP based SR transmissions. In this way, the selected STAs 108 do not need to reduce transmit power based on OBSS APs 104 when those STAs 108 are transmitting BARs during the SRP opportunity. In this way, location accuracies can be improved as the STAs 108 can use nominal transmit power.

The AP's 104 may then receive a BA, in response to the BAR sent in stage 552, in stage 556. The RSSI of the BA may then be recorded. If the BA RSSI for any one STA 108, during an SRP opportunity, is lesser than a previously recorded value, by some amount or beyond some predetermined threshold, the recorded RSSI can be discarded and a new BAR may be scheduled to avoid location inaccuracies. In other words, RSSIs that appear to be inaccurate or change greatly from previous RSSI's received from that STA 108 can be avoided. Transmitting a burst of BARs during a SRP opportunity whenever possible is better suited for Angle of Arrival (AoA) based hyperlocation scanning as well where multiple BARs (a total of 16) are sent to each of the selected clients within the same scan window. Each of the clients may try to respond to these BAR responses.

These BARs may be scheduled when there is no downlink traffic to transmit at the AP 104. In this case, the AP 104 can use the lowest priority traffic identifier (TID) to burst the BARs to the client stations 108 at the given BAR transmit opportunity in the beacon interval. This transmit opportunity and TID makes sure that the uplink fairness is considered as well for the STAs 108 and the AP 104. For those clients or STAs 108 that are entering the sleep mode, the QoS Null frame may be received with the PM bit set as described above, in stage 560. The RSSI from either the BA received in stage 556 or the RSSI received from the QoS Null frame, in stage 560, may be provided to the locator 216.

The locator can receive or determine the location for the STA 108 by comparing the RSSI values received by one or more APs 104. In this way, each AP may provide the RSSI for a given STA 108, with the STA's ID 308. A triangulation function may be performed to determine the location of the idle client station 108. This may then be stored with the client ID 308 as information to use later for transmit or receive configurations, using spatial reuse and other types of spatial transmission functions.

FIG. 6 illustrates an embodiment of a communications device 600 that may implement one or more of APs 104, controllers 101, and/or STAs 108 of FIG. 1. In various embodiments, device 600 may comprise a logic circuit. The logic circuit may include physical circuits to perform operations described for one or more of APs 104, controllers 101, and STAs of FIG. 1, for example. As shown in FIG. 6, device 600 may include one or more of, but is not limited to, a radio interface 605, baseband circuitry 625, and/or computing platform 645.

The device 600 may implement some or all of the structures and/or operations for one or more of APs 104, controllers 101, and/or STAs 108 of FIG. 1, storage medium 655, and logic circuit in a single computing entity, such as entirely within a single device. Alternatively, the device 600 may distribute portions of the structure and/or operations using a distributed system architecture, such as a client-server architecture, a peer-to-peer architecture, a master-slave architecture, etc.

An radio interface 605, which may also include an analog front end (AFE), may include a component or combination of components adapted for transmitting and/or receiving single-carrier or multi-carrier modulated signals (e.g., including Complementary Code Keying (CCK), orthogonal frequency division multiplexing (OFDM), and/or Single-Carrier Frequency Division Multiple Access (SC-FDMA) symbols) although the configurations are not limited to any specific over-the-air interface or modulation scheme. The radio interface 605 may include, for example, a receiver 610 and/or a transmitter 615. Radio interface 605 may include bias controls, a crystal oscillator, and/or one or more antennas 620. In additional or alternative configurations, the radio interface 605 may use oscillators and/or one or more filters, as desired.

Baseband circuitry 625 may communicate with radio interface 605 to process, receive, and/or transmit signals and may include, for example, an Analog-To-Digital Converter (ADC) for down converting received signals with a Digital-To-Analog Converter (DAC) 630 for up converting signals for transmission. Further, baseband circuitry 625 may include a baseband or Physical layer (PHY) processing circuit for the PHY link layer processing of respective receive/transmit signals. Baseband circuitry 625 may include, for example, a Medium Access Control (MAC) processing circuit 635 for MAC/data link layer processing. Baseband circuitry 625 may include a memory controller for communicating with MAC processing circuit 635 and/or a computing platform 645, for example, via one or more interfaces 640.

In some configurations, PHY processing circuit may include a frame construction and/or detection module, in combination with additional circuitry such as a buffer memory, to construct and/or deconstruct communication frames. Alternatively or in addition, MAC processing circuit 635 may share processing for certain of these functions or perform these processes independent of PHY processing circuit. In some configurations, MAC and PHY processing may be integrated into a single circuit.

The computing platform 645 may provide computing functionality for the device 600. As shown, the computing platform 645 may include a processing component 650. In addition to, or alternatively of, the baseband circuitry 625, the device 600 may execute processing operations or logic for one or more of APs 104, controllers 101, and/or STAs 108, storage medium 655, and logic circuits using the memory components 655. The processing component 650 (and/or PHY and/or MAC 635) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, Application Program Interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 645 may further include other platform components. Other platform components include common computing elements, such as one or more processors, multi-core processors, co-processors, memory units, chipsets, controllers, peripherals, interfaces, oscillators, timing devices, video cards, audio cards, multimedia Input/Output (I/O) components (e.g., digital displays), power supplies, and so forth. Examples of memory units 655 may include without limitation various types of computer readable and machine readable storage media in the form of one or more higher speed memory units, such as Read-Only Memory (ROM), Random-Access Memory (RAM), Dynamic RAM (DRAM), Double-Data-Rate DRAM (DDRAM), Synchronous DRAM (SDRAM), Static RAM (SRAM), Programmable ROM (PROM), Erasable Programmable ROM (EPROM), Electrically Erasable Programmable ROM (EEPROM), flash memory, polymer memory such as ferroelectric polymer memory, ovonic memory, phase change or ferroelectric memory, Silicon-Oxide-Nitride-Oxide-Silicon (SONOS) memory, magnetic or optical cards, an array of devices such as Redundant Array of Independent Disks (RAID) drives, solid state memory devices (e.g., Universal Serial Bus (USB) memory, Solid State Drives (SSD) and any other type of storage media suitable for storing information.

Device 600 may be, for example, an ultra-mobile device, a mobile device, a fixed device, a Machine-To-Machine (M2M) device, a Personal Digital Assistant (PDA), a mobile computing device, a smart phone, a telephone, a digital telephone, a cellular telephone, user equipment, eBook readers, a handset, a one-way pager, a two-way pager, a messaging device, a computer, a Personal Computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 600 described herein, may be included or omitted in various embodiments of device 600, as suitably desired.

Embodiments of device 600 may be implemented using Single Input Single Output (SISO) architectures. However, certain implementations may include multiple antennas (e.g., antennas 620) for transmission and/or reception using adaptive antenna techniques for beamforming or Spatial Division Multiple Access (SDMA) and/or using MIMO communication techniques.

The components and features of device 600 may be implemented using any combination of discrete circuitry, Application Specific Integrated Circuits (ASICs), logic gates and/or single chip architectures. Further, the features of device 600 may be implemented using microcontrollers, programmable logic arrays and/or microprocessors or any combination of the foregoing where suitably appropriate. It is noted that hardware, firmware, and/or software elements may be collectively or individually referred to herein as "logic," "circuit," or "processor."

The device in FIG. 6 can also contain a security module (not shown). This security module can contain information regarding, but not limited to, security parameters required to connect the device to another device or other available networks or network devices, and can include Wireless Equivalent Privacy (WEP) or Wi-Fi Protected Access (WPA) security access keys, network keys, etc., as discussed.

Another module that the device in FIG. 6 can include is a network access unit (not shown). The network access unit can be used for connecting with another network device. In one example, connectivity can include synchronization between devices. In another example, the network access unit can work as a medium which provides support for communication with other stations. In yet another example, the network access unit can work in conjunction with at least the MAC circuitry 635. The network access unit can also work and interact with one or more of the modules/components described herein.

It should be appreciated that the exemplary device 600 shown in the block diagram of FIG. 6 may represent one functionally descriptive example of many potential implementations. Accordingly, division, omission, or inclusion of block functions depicted in the accompanying figures does not infer that the hardware components, circuits, software and/or elements for implementing these functions would be necessarily be divided, omitted, or included in embodiments.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the elements illustrated in FIG. 1 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspects herein comprise a method comprising: identifying, by an access point (AP), an idle window in a fast locate scan interval; scheduling a Block Acknowledgement Request (BAR) for an idle Station (STA) in the idle window; transmitting the BAR in the idle window; receiving a Block Acknowledgement (BA) in response to the BAR; determining a characteristic about the BA; and based on the characteristic, determining a location of the idle STA.

Any of the one or more above aspects, wherein the idle window is a slot reserved in a beacon interval.

Any of the one or more above aspects, wherein the slot is a non-TWT slot for transmission to a non HE STA.

Any of the one or more above aspects, wherein the BAR is sent to a HE STA in the non-TWT slot.

Any of the one or more above aspects, wherein two or more BARs are sent during the fast locate scan interval.

Any of the one or more above aspects, wherein the two or more BARs are distributed during the fast locate scan interval.

Any of the one or more above aspects, wherein a time interval between BAR transmissions is governed by an equation where a number of non-TWT slots is multiplied by a slot time for each of the non-TWT slots then subtracting a start offset and an end offset, with a result being divided by a number of STAs to be sent a BAR.

Any of the one or more above aspects, wherein BARs are transmitted to two or more STAs based on a sleep likelihood factor.

Any of the one or more above aspects, wherein a first STA with a lower sleep likelihood factor receives a first BAR transmission before a second STA with a higher sleep likelihood factor.

Any of the one or more above aspects, wherein the characteristic is a Received Signal Strength Indicator (RSSI), and wherein triangulation, based on the RSSI of the BA, between three or more APs determines the location of the idle STA.

Aspects herein further comprise an access point (AP) comprising: a radio operable to: send a Block Acknowledgement Request (BAR); and receive a Block Acknowledgement (BA) in response to the BAR; a memory; a processor in communication with the memory and the radio, the processor operable to: identify an idle window in a fast locate scan interval; schedule the BAR for an idle Station (STA) in the idle window; transmit the BAR in the idle window; receive the BA in response to the BAR; determine a characteristic about the BA; and based on the characteristic, determining a location of the idle STA.

Any of the one or more above aspects, wherein the idle window is a slot reserved in a beacon interval, wherein the slot is a non-TWT slot for transmission to a non TWT agreement established HE STA, and wherein the BAR is sent to a non-HE STA in the non-TWT slot.

Any of the one or more above aspects, wherein two or more BARs are sent during the fast locate scan interval, wherein the two or more BARs are distributed during the fast window, and wherein a time interval between BAR transmissions is governed by an equation where a number of non-TWT slots is multiplied by a slot time for each of the non-TWT slots then subtracting a start offset and an end offset, with a result being divided by a number of STAs to be sent a BAR.

Any of the one or more above aspects, wherein BARs are transmitted to two or more STAs based on a sleep likelihood factor, and wherein a first STA with a lower sleep likelihood factor receives a first BAR transmission before a second STA with a higher sleep likelihood factor.

Any of the one or more above aspects, wherein the characteristic is a Received Signal Strength Indicator (RSSI), and wherein triangulation, based on the RSSI of the BA, between three or more APs determines the location of the idle STA.

Aspects herein further comprise a network comprising: a first Access Point (AP) operable to: identify an idle window in a fast locate scan interval; schedule a Block Acknowledgement Request (BAR) for an idle Station (STA) in the idle window; transmit the BAR in the idle window; receive a Block Acknowledgement (BA) in response to the BAR; determine a first characteristic about the BA; receive a second characteristic about the BA from a second AP; and based on the first characteristic and the second characteristic, determining a location of the idle STA; the second AP) operable to: receive the BA; determine the second characteristic about the BA; and send the second characteristic to the first AP.

Any of the one or more above aspects, wherein the idle window is a slot reserved in a beacon interval wherein the slot is a non-TWT slot for transmission to a non TWT agreement established HE STA, and wherein the BAR is sent to a non-HE STA in the non-TWT slot.

Any of the one or more above aspects, wherein two or more BARs are sent during the fast locate scan interval, wherein the two or more BARs are distributed during the fast locate scan interval, and wherein a time interval between BAR transmissions is governed by an equation where a number of non-TWT slots is multiplied by a slot time for each of the non-TWT slots then subtracting a start offset and an end offset, with a result being divided by a number of STAs to be sent a BAR.

Any of the one or more above aspects, wherein BARs are transmitted to two or more STAs based on a sleep likelihood factor, and wherein a first STA with a lower sleep likelihood factor receives a first BAR transmission before a second STA with a higher sleep likelihood factor.

Any of the one or more above aspects, wherein the characteristic is a Received Signal Strength Indicator (RSSI), and wherein triangulation, based on the RSSI of the BA, between three or more APs determines the location of the idle STA.

Any of the one or more above aspects in combination with any of the other one or more above aspects.

A means of any of the one or more above aspects.

Any of the one or more above aspects as described herein.

What is claimed is:
1. A method comprising:
    identifying, by an access point (AP), an idle window in a fast locate scan interval wherein the idle window is a slot reserved in a beacon interval wherein the slot is a non-Target Wake Time (TWT) slot for transmission to a non-TWT agreement established High Efficiency (HE) Station (STA);
    scheduling a Block Acknowledgement Request (BAR) for an idle STA in the idle window wherein the BAR is sent to a non-HE STA in the non-TWT slot wherein two or more BARs are sent during the fast locate scan interval;

transmitting the BAR in the idle window wherein a time interval between BAR transmissions is governed by an equation where a number of non-TWT slots is multiplied by a slot time for each of the non-TWT slots then subtracting a start offset and an end offset, with a result being divided by a number of STAs to be sent a BAR;

receiving a Block Acknowledgement (BA) in response to the BAR;

determining a characteristic about the BA; and based on the characteristic, determining a location of the idle STA.

2. The method of claim 1, wherein BARs are transmitted to two or more STAs based on a sleep likelihood factor, and wherein a first STA with a lower sleep likelihood factor receives a first BAR transmission before a second STA with a higher sleep likelihood factor.

3. The method of claim 2, wherein one or more BARs are burst to one or more STAs and wherein a BAR is sent as a Spatial Reuse (SR) Physical Layer Convergence Procedure (PLCP) Protocol Data Unit (PPDU) (SRP) to initiate an exchange of BAR and BA during a SRP opportunity that may arise within the fast locate scan interval.

4. The method of claim 1, wherein the characteristic is a Received Signal Strength Indicator (RSSI), and wherein triangulation, based on the RSSI of the BA, between three or more APs determines the location of the idle STA.

5. An access point (AP) comprising:
a radio operable to:
send a Block Acknowledgement Request (BAR); and
receive a Block Acknowledgement (BA) in response to the BAR;
a memory;
a processor in communication with the memory and the radio, the processor operable to:
identify an idle window in a fast locate scan interval;
schedule the BAR for an idle Station (STA) in the idle window;
transmit the BAR in the idle window wherein two or more BARs are sent during the fast locate scan interval, wherein the two or more BARs are distributed during the fast locate scan interval, and wherein a time interval between BAR transmissions is governed by an equation where a number of non-Target Wake Time (TWT) slots is multiplied by a slot time for each of the non-TWT slots then subtracting a start offset and an end offset, with a result being divided by a number of STAs to be sent a BAR;
receive the BA in response to the BAR;
determine a characteristic about the BA; and
based on the characteristic, determining a location of the idle STA.

6. The AP of claim 5, wherein the idle window is a slot reserved in a beacon interval, wherein the slot is a non-TWT slot for transmission to a non TWT agreement established High Efficiency (HE) STA, and wherein the BAR is sent to a non-HE STA in the non-TWT slot.

7. The AP of claim 5, wherein BARs are transmitted to two or more STAs based on a sleep likelihood factor, and wherein a first STA with a lower sleep likelihood factor receives a first BAR transmission before a second STA with a higher sleep likelihood factor.

8. The AP of claim 5, wherein the characteristic is a Received Signal Strength Indicator (RSSI), and wherein triangulation, based on the RSSI of the BA, between three or more APs determines the location of the idle STA.

9. A network comprising:
a first Access Point (AP) operable to:
identify an idle window in a fast locate scan interval;
schedule a Block Acknowledgement Request (BAR) for an idle Station (STA) in the idle window;
transmit the BAR in the idle window wherein two or more BARs are sent during the fast locate scan interval wherein the two or more BARs are distributed during the fast locate scan interval, and wherein a time interval between BAR transmissions is governed by an equation where a number of non-TWT slots is multiplied by a slot time for each of the non-TWT slots then subtracting a start offset and an end offset, with a result being divided by a number of STAs to be sent a BAR;
receive a Block Acknowledgement (BA) in response to the BAR;
determine a first characteristic about the BA;
receive a second characteristic about the BA from a second AP; and
based on the first characteristic and the second characteristic, determining a location of the idle STA;
the second AP operable to:
receive the BA;
determine the second characteristic about the BA; and
send the second characteristic to the first AP.

10. The network of claim 9, wherein the idle window is a slot reserved in a beacon interval, wherein the slot is a non-TWT slot for transmission to a non TWT agreement established High Efficiency (HE) STA, and wherein the BAR is sent to a non-HE STA in the non-TWT slot.

11. The network of claim 9, wherein BARs are transmitted to two or more STAs based on a sleep likelihood factor, and wherein a first STA with a lower sleep likelihood factor receives a first BAR transmission before a second STA with a higher sleep likelihood factor.

12. The network of claim 11, wherein the characteristic is a Received Signal Strength Indicator (RSSI), and wherein triangulation, based on the RSSI of the BA, between three or more APs determines the location of the idle STA.

* * * * *